2,868,747

FURAN RESIN COMPOSITIONS INCLUDING TALL OIL AND AN AROMATIC ALDEHYDE

Raymond M. Frey, Hales Corners, Wis., assignor to McGraw-Edison Company, a corporation of Delaware No Drawing. Application November 4, 1955
Serial No. 545,110

9 Claims. (Cl. 260—23.5)

The present invention relates to thermosetting resinous compositions, and especially relates to the furan resins and their production.

The invention is the preparation of the improved resinous bodies from ingredients including a furan compound such as furfural or furfuryl alcohol, and an aromatic aldehyde, such as benzaldehyde, in combination with tall oil.

Another object of the invention is to provide a new resinous thermosetting composition by effecting reaction between a furan compound, tall oil and an aromatic aldehyde selected from a group consisting of benzaldehyde, cinnamaldehyde, p-hydroxy benzaldehyde, salicylaldehyde and naphthaldehyde.

It is well known that furan resins may be polymerized to provide characteristics of exceptional physical strength and shock resistance, in addition to having superior chemical resistance to alkalies, acids and ordinary solvents. It is also well known that furan compounds have been successfully reacted in simple condensation procedures with other ingredients such as phenols or various aldehyde compounds to provide a resin having certain desired characteristics.

In my copending application, Serial No. 340,281, filed March 4, 1953, which was granted on February 21, 1956, as Patent No. 2,735,826, I have disclosed as a new composition of matter, certain furan compositions and the process for preparing the same, wherein tall oil in either a crude or refined state, may be included as an ingredient of a basic furan resin composition. The addition of tall oil, as disclosed therein, acted to extend or modify the basic furan composition to provide a product that is simple to control in its exothermic condensation reaction, less expensive to prepare, which provides the same desirable characteristics of the basic furan resin, and which may be cast or pressure-molded and filled prior to complete curing with various molding composition fillers.

The present application is directed to the addition of tall oil to a furan-aromatic aldehyde reaction to provide a new composition of matter and to the process for preparing such composition.

The reaction appears to be electrophillic in nature and accordingly, is responsive to the well-known Lewis acid catalyst. These acid catalysts have been fully described as to their nature and action on page 80 of the treatise, Advanced Organic Chemistry, 2nd ed., by G. W. Wheland, Wiley and Sons, Inc., New York.

It is to be noted that tall oil, in its crude state, includes from 40 to 60% fatty acids and 35 to 50% rosin acids, wherein the fatty acids are principally unsaturated and comprise oleic acid, linoleic acid and linolenic acid. In the reactions of the furan compound, aromatic aldehyde and tall oil, the only side compound formed, which did not subsequently combine with the final product, was water, a natural product of the condensation reaction. Though it is not entirely clear that all of the ingredients chemically reacted with one another to provide the thermosetting compound, it is at least apparent that the addition of the tall oil combines to act as a helpful extender having little or no effect on the final desired characteristics of the basic furan resin.

The resulting product of my invention is an improved furan resin which may be cast directly or which may be filled with various materials under pressure molding conditions and having excellent physical strength and shock resistance. The resultant material may be used in any manner acceptable for use with the well-known furfuryl alcohol resins.

Aside from using benzaldehyde as an ingredient, numerous other aromatic aldehydes have been successfully reacted with a furan compound and tall oil. Examples of these are cinnamaldehyde, p-hydroxy benzaldehyde, salicylaldehyde (o-hydroxy benzaldehyde), and naphthaldehyde.

Typical examples of carrying out the present invention are given below:

Example 1

(a) A 3:2:1 ratio of furfuryl alcohol, crude tall oil and benzaldehyde were reacted together using 60 gms. of alcohol, 40 gms. of crude tall oil and 20 gms. of benzaldehyde. These materials were added together at room temperature in the presence of about 2% of diethyl sulfate as the catalyst. The mixture was heated on a water bath from room temperature to approximately 180° F., at which point an exothermic reaction took place. The exothermic reaction provided a temperature rise of approximately 50° F. The mixture was then removed from the water bath and permitted to cool to a temperature of approximately 180°. Heat was then applied to maintain the 180° F. temperature within plus or minus 5 degrees to permit polymerization to take place. The polymerization proceeded until the material thickened to the desired casting consistency. After casting into a suitable shape, the cast object was placed in an oven and maintained at a temperature of approximately 180° F. for final curing.

(b) The ingredients were processed in substantially the identical manner set forth above, with the exception that they were reacted together in a 1:1:1 ratio by weight. The resultant product was also very acceptable, in that it produced a thermosetting resin of excellent strength without indication of any leaching out of the reactants on final curing.

(c) The same ingredients were again reacted in the same manner as described above, except that a ratio of 3:2:2 by weight of furfuryl alcohol, crude tall oil and benzaldehyde were reacted together with 2% by weight of total mix of the diethyl sulfate catalyst. Again, the thermosetting resin obtained after final curing was very hard, uniform and shiny.

Example 2

(a) 60 gms. of furfuryl alcohol, 40 gms. of crude tall oil were mixed with 20 gms. of cinnamaldehyde:

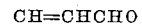

The mixture also included about 2% diethyl sulfate as a catalyst, and was reacted in substantially the same manner outlined in connection with Example 1 to provide a thermosetting resin which was hard, uniform and strong.

(b) A 2:1:2 ratio of furfural (furfural aldehyde), tall oil and cinnamaldehyde also reacted together in the presence of 2% diethyl sulfate to provide a thermosetting resin of uniform consistency and shiny texture.

Example 3

(a) 60 gms. of furfuryl alcohol, 40 gms. of tall oil were mixed in the presence of diethyl sulfate as a catalyst with 40 gms. of p-hydroxy benzaldehyde:

The above ingredients were reacted together in a condensation reaction substantially identical to that outlined in connection with Example 1. The resultant product was strong and uniform and of a thermosetting nature.

(b) 60 gms. of furfural, 40 gms. of tall oil mixed with 40 of p-hydroxy benzaldehyde also reacted in the presence of the catalyst to satisfactorily provide a uniform, smooth thermosetting resin.

Example 4

60 gms. of furfuryl alcohol, 40 gms. of tall oil were mixed in the presence of 2% diethyl sulfate with the aromatic aldehyde, salicylaldehyde:

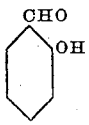

The above ingredients were mixed according to the process set forth in Example 1 and produced a thermosetting resin which was uniform in consistency and had a shiny surface.

Example 5

In the present example, 60 gms. of furfuryl alcohol and 40 gms. of tall oil were admixed with 40 gms. of naphthaldehyde:

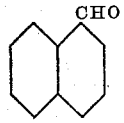

The reaction took place in the presence of 2% diethyl sulfate as a catalyst, and again produced a thermosetting resin which was uniform in consistency.

It will be apparent that the present invention has provided an improved furan resin and method for its preparation, wherein the addition of tall oil as a helpful extender contributes to a considerable cost reduction without any way detrimentally affecting the excellent chemical and physical characteristics of the basic composition.

I claim:

1. A method of preparing a thermosetting resin including the steps of admixing from 1 to 3 parts of a furan compound selected from the group consisting of furfural and furfuryl alcohol, 1 to 2 parts tall oil, and 1 to 2 parts of an aromatic aldehyde, in the presence of diethyl sulfate as a catalyst, heating the mixture until thickened by resinification, and heat curing the thickened mixture to a thermosetting state.

2. The method of claim 1, wherein the aromatic aldehyde is benzaldehyde.

3. The method of claim 1, wherein the ingredients are combined in a 3:2:1 ratio by weight of furfuryl alcohol, tall oil and benzaldehyde, respectively.

4. The method of claim 1, wherein the ingredients are combined in a 1:1:1 ratio by weight of furfuryl alcohol, tall oil and benzaldehyde, respectively.

5. The method of claim 1, wherein the ingredients are combined in a 3:2:2 ratio by weight of furfuryl alcohol, tall oil and benzaldehyde, respectively.

6. The method of claim 1, wherein the aromatic aldehyde is cinnamaldehyde.

7. The method of claim 1, wherein the aromatic aldehyde is p-hydroxy benzaldehyde.

8. The method of claim 1, wherein the aromatic aldehyde is salicylaldehyde.

9. The method of claim 1, wherein the aromatic aldehyde is naphthaldehyde.

References Cited in the file of this patent

UNITED STATES PATENTS

| | | |
|---|---|---|
| 1,873,599 | Kappler | Aug. 23, 1932 |
| 2,572,071 | St. Clair et al. | Oct. 23, 1951 |